United States Patent [19]
Peacock

[11] Patent Number: 5,259,334
[45] Date of Patent: Nov. 9, 1993

[54] HERRINGBONE DAIRY STALL HAVING INJURY PREVENTING BUTT PLATE

[76] Inventor: Steve N. Peacock, P.O. Box 1410, Anthony, N. Mex. 88021

[21] Appl. No.: 976,362

[22] Filed: Nov. 17, 1992

[51] Int. Cl.⁵ ............................................... A01K 1/12
[52] U.S. Cl. ................................... 119/14.03; 119/27
[58] Field of Search .................... 119/27, 14.03, 14.04, 119/147.1, 148

[56] References Cited

U.S. PATENT DOCUMENTS 3,699,922 10/1972 Holm .
3,738,320 6/1973 Holm .
3,783,830 1/1974 Holm .
3,828,733 8/1974 Correia .
4,194,467 3/1980 Nielsen et al. .
4,362,127 12/1982 Nielsen et al. .
4,508,059 4/1985 Anderson .
4,516,530 5/1985 Reisgies et al. .
4,951,608 8/1990 Reisgies et al. .

*Primary Examiner*—Robert P. Swiatek
*Assistant Examiner*—Todd E. Manahan
*Attorney, Agent, or Firm*—Shoemaker and Mattare, Ltd.

[57] ABSTRACT

A herringbone dairy stall comprises a brisket barrier for keeping cows from moving forward out of the stall, and a rear barrier, comprising a series of butt plates, for restraining the cows from behind. The forwardly protruding vertical edge of each butt plate is relieved at its upper end to clear the pin bone of cows entering the stall, thus reducing the incidence of hip injury.

7 Claims, 4 Drawing Sheets

HERRINGBONE DAIRY STALL HAVING INJURY PREVENTING BUTT PLATE

BACKGROUND OF THE INVENTION

This invention relates to animal confinement, generally, and more particularly, to an apparatus for confining cows to stalls during milking.

"Herringbone" stalls, in which cows are arranged side-by-side along a line diagonal to their length, are popular because of the high densities they achieve, and improved traffic flow, since cows do not have to make right angle turns in them. In a herringbone parlor, a number of cows are driven into a multi-cow stall confined on one side by a horizontal brisket barrier, and on the other side by a series of butt plates each arranged at an angle to the length of the stall. Each cow, when properly loaded in the stall, has its head over the brisket barrier, and its tail against one of the butt plates. The cows are released simultaneously by lifting the brisket barrier. Most often, a dairy is provided with a series of alternating geometrically similar (mirror-image) stalls; hence the name herringbone.

From the standpoint of injury potential, stall loading is critical, and in fact herringbone stalls are prone to traffic jams. Cows do not always enter herringbone stalls in orderly fashion. As they enter the stall, cows sometimes become excited, confused, or ornery, and rather than waiting in line, they may attempt to push ahead. When one cow attempts to pass another within the narrow stall, the cow pressed against the butt barrier may suffer injury to its hip from contact with a protruding vertical edge of a butt plate. The most vulnerable point is the widest point of the hip, which is commonly referred to as the "pin" or "hook" bone. To prevent such injury, prior inventors have rounded the edges of protruding butt plates substantially; the edges still protrude, however, and the "pin" bone on the hip remains susceptible to injury. Thus invention is directed to reducing the pin bone injuries that result to cows from pushing and shoving within a herringbone stall.

SUMMARY OF THE INVENTION

An object of the invention is to reduce hip injuries to cows entering a herringbone stall.

A related object is to improve the comfort of cows in such a stall.

These and other objects of the invention are met by a herringbone stall comprising a brisket barrier for keeping cows from moving forward out of the stall, and a rear barrier for restraining the cows from behind, the improvement wherein the rear barrier comprises a series of butt plates, each having a rounded, forwardly protruding vertical edge, and a beveled relief at the upper end of said edge for clearing the pin bone of cows entering the stall.

BRIEF DESCRIPTION OF THE DRAWINGS

In the accompanying drawings.

DESCRIPTION OF THE PREFERRED EMBODIMENT

Figure 1:
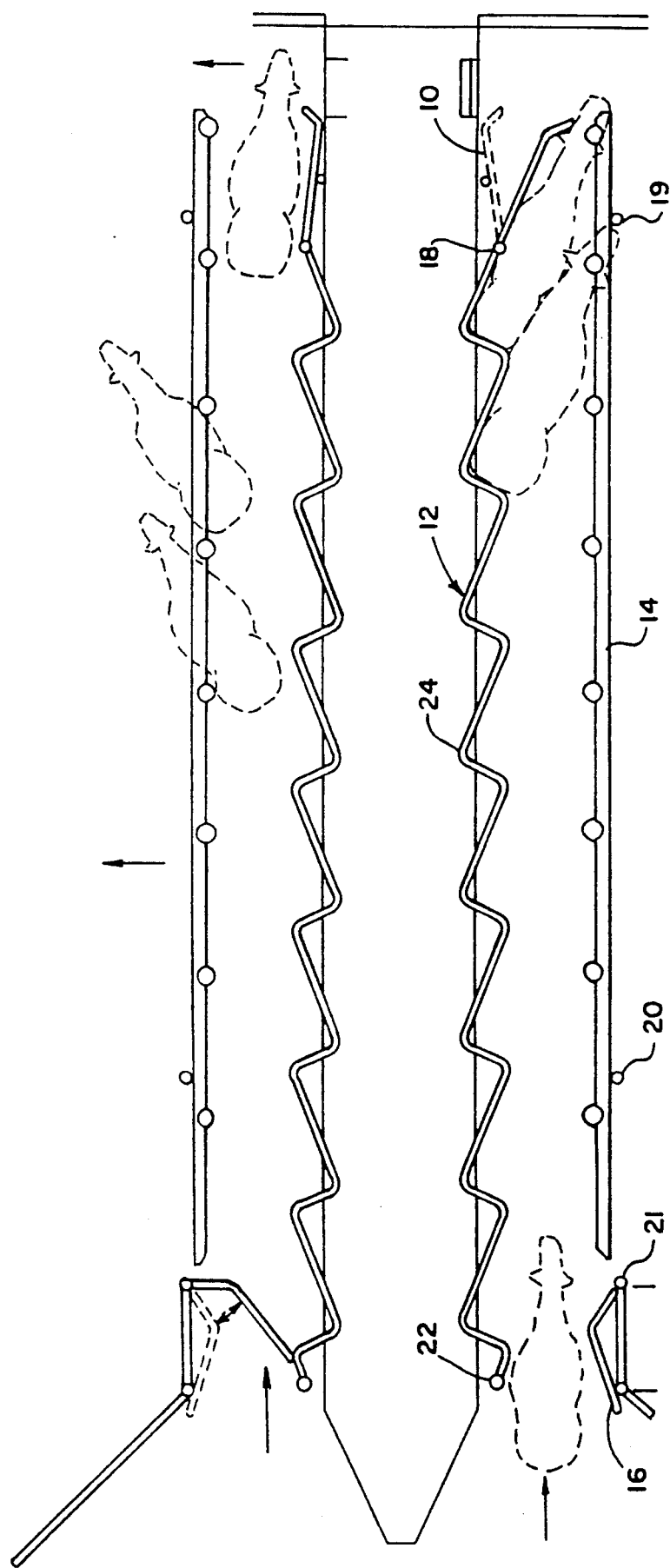
FIG. 1 is a top plan view of a stall embodying the invention.
Figure 2:
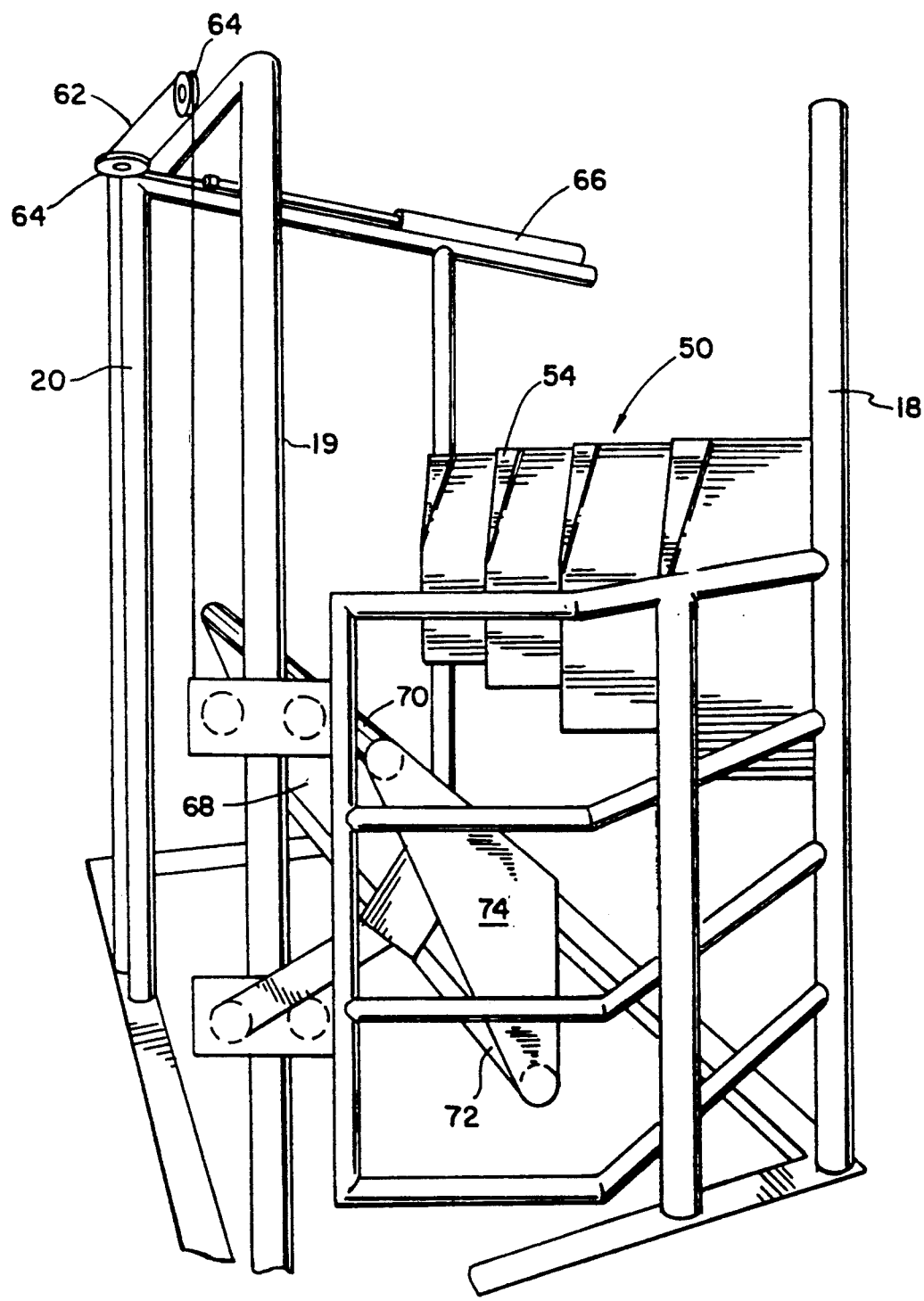
FIG. 2 is a perspective view taken from the front end of the stall.
Figure 3:
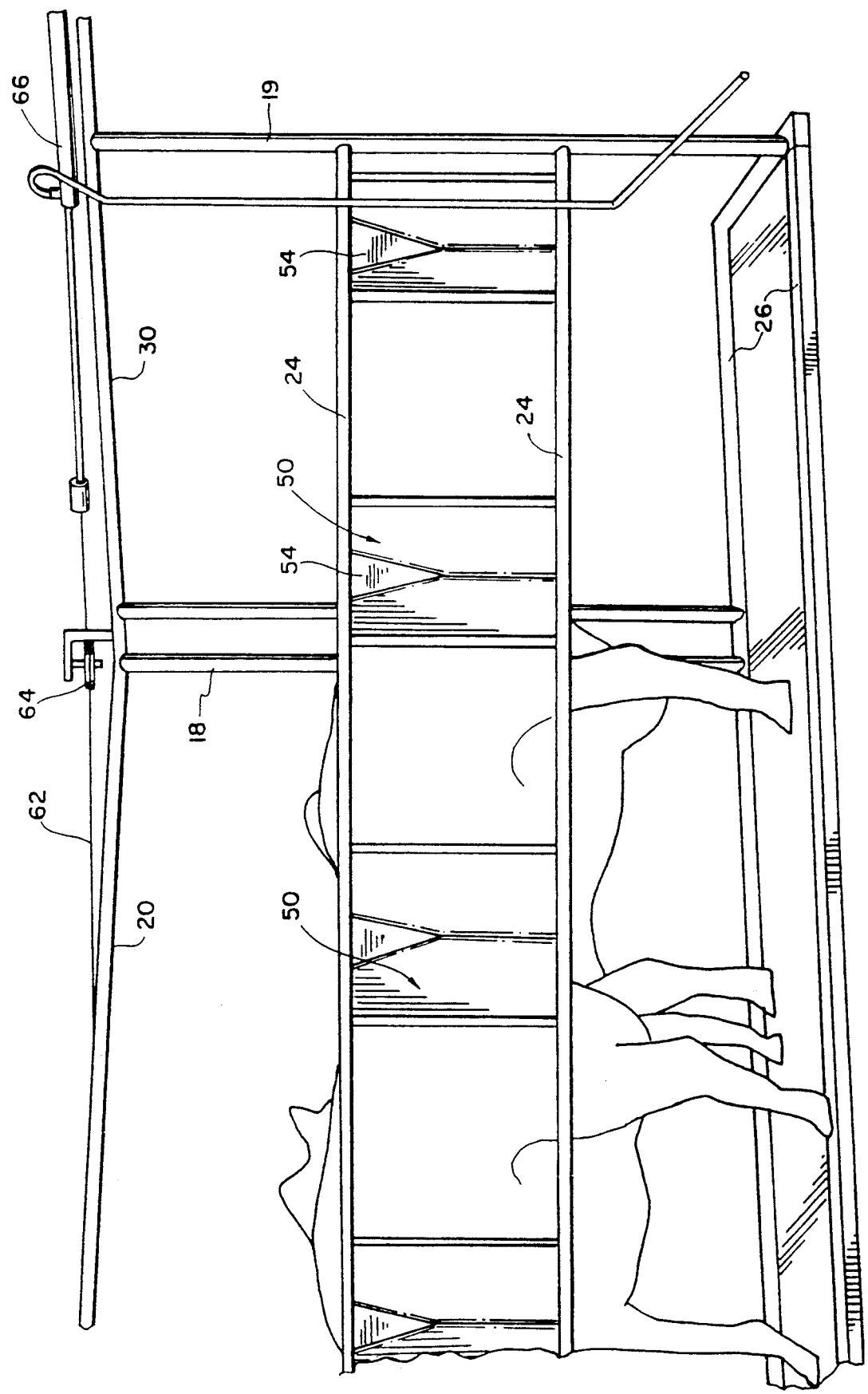
FIG. 3 is a left side elevation thereof, showing a series of butt plates.

As shown in FIGS. 1–3, a stall embodying the invention comprises a stationary front end gate 10, a stationary left side barrier 12, a vertically movable right side brisket barrier 14, and a pivotable rear gate 16, all of which are supported on standards of posts 18–22 affixed to a common frame or floor 26, and interconnected above by braces 28–30.

The front end gate 10 is fixed, and serves to limit forward motion of the cows in the stall. Ordinarily the first cow to enter the stall assumes a position against the front gate, with the gate on its left.

The left side barrier 12 comprises a pair of rails 24 extending horizontally between two of the posts 18, and 22. The upper rail is at about cow back level, and the lower rail is about even with the top of the udder. Each rail has a zigzag shape, when viewed from above (FIG. 1). The crest-to-crest pitch (distance between adjacent crests) of the rails is in the range of thirty to forty-five inches, forty-four inches currently being most preferred.

Figure 4:
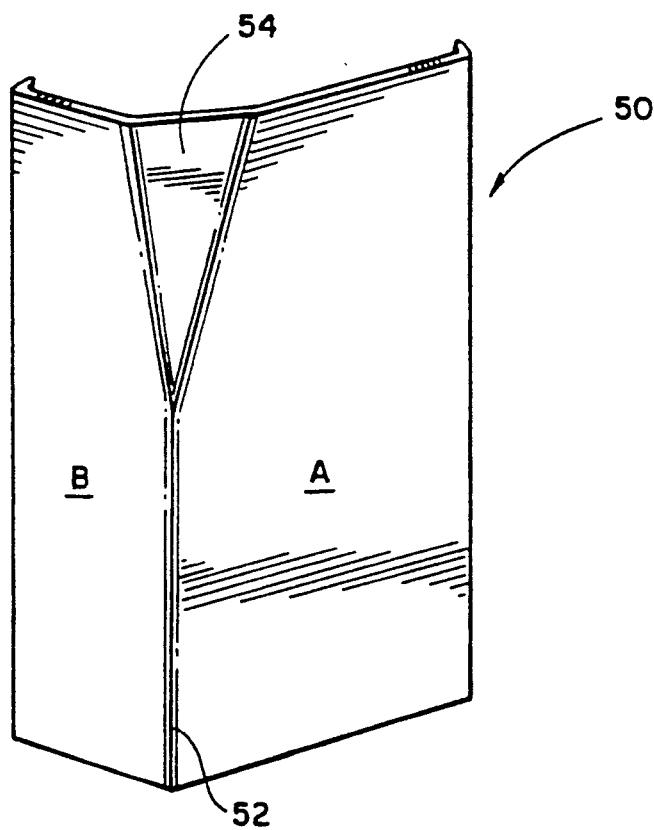
FIG. 4 is a detailed perspective view of one butt plate, taken in the direction of arrow "A" in FIG. 2.

The shorter segments of each crest are about 21 inches long, and the longer segments are about 35 inches long. The sides of the crests facing the cows' hips are each covered with a metal butt plate 50 designed to protect vulnerable parts of the hip bone. Each plate, one of which is shown in detail in FIG. 4, is bent approximately 65° about a vertical centerline, forming a forwardly protruding vertical edge 52 having a generous bend radius of about three inches. Larger and smaller rectangular panels A and B, respectively, lie on either side of the edge 52. Each panel is about thirty-four inches tall, sufficient to span the distance between the rails. The larger panel A has a width of about eighteen inches, and the smaller panel B is about nine inches wide.

To protect the pin bone, the upper part of the plate is relieved, that is, beveled rearward, at an angle of about 10° from the vertical. To produce the beveled relief, a triangular portion is removed from the facing upper corners of both panels. The base of the removed triangular portion is about four inches on the larger panel, and two inches on the smaller panel; the altitude of each is about eighteen inches. The hypotenuses of the removed triangles form a fifth side on each of the respective panel; these two fifth sides are then interconnected by welding in a triangular piece 54 of sheet metal, best seen in FIG. 4, and the weld joints with the two panels are rounded on a radius of about one-and-a-half inches. With this construction, the part of the hip most vulnerable to injury, the pin bone, avoids contacting the edge of the butt plate, as only lower portions of the hip or leg bear against it. The installed height of the panels should be altered, if necessary, so that the bevels 54 are centered at about the mean pin bone height of the particular animals being handled.

Returning to FIG. 1, note that the post 21 supports the rear end gate, which can swing shut against the post 22 as shown. The posts 19 and 20 support the brisket barrier 14, which has four sets of rollers 60 (FIG. 2) permitting it to move vertically on the posts. The barrier is lifted at two points by a common mechanism, so that the barrier remains horizontal at all times. The mechanism preferably includes a pair of steel cables 62 running over respective pulleys 64 and connected to a common draw mechanism, such as a pneumatic cylinder 66 or other linear motor. Alternatively, a winching mechanism could be used. The barrier comprises a steel sheet 68 bent about a horizontal line into two portions, each about eleven inches high, having a dihedral angle of about 40°. The lower portion lies in a vertical plane. The upper and lower edges of the panel are welded to upper and lower tubes 70 and 72 respectively, and the ends of the panel and the tubes are covered with triangular protective caps 74.

At the start of a milking cycle, the brisket barrier is lowered to shoulder level, and cows are herded into the stall through the open rear gate. In most cases, the first cow will proceed to the front barrier, and will face the brisket barrier, which is below head level. Its tail will be against, or near, the first butt panel. Ideally, the next cow will line up next to the first, with its tail against the second panel, and so forth, until the stall is full. But when cows are confused, or uncooperative, some may be pushed sideways against the vertical edges of the butt plates. The present invention reduces the incidence of hip injury in these situations, compared to prior herringbone stalls.

Once the cows are in position in the stall, they are unable to move around much, and milking can be accomplished efficiently. When milking is finished, the front barrier is raised, and the cows exit the stall simultaneously.

Inasmuch as the invention is subject to modifications and variations, it is intended that the foregoing description and the accompanying drawings shall be interpreted as illustrative of only one form of the invention, whose scope is to be measured by the following claims.

I claim:

1. In a herringbone dairy stall comprising a front barrier for keeping cows from moving forward out of the stall, and a rear barrier for restraining the cows from behind, the improvement wherein the rear barrier comprises a series of butt plates, each comprising a pair of substantially vertical panels joined at an angle to one another along a rounded, forwardly protruding vertical edge, said edge having a rearwardly beveled relief level with the pin bones of cows in the stall, to prevent injury thereto.

2. The invention of claim 1, wherein said relief is formed by a non-vertical triangular panel extending in a plane intersecting each of said vertical panels and intersecting said vertical edge.

3. The invention of claim 2, wherein said triangular panel is inclined at an angle of about ten degrees from vertical.

4. The invention of claim 2, wherein edges formed at the intersections of said triangular panels and said vertical panels are rounded at a radius of at least one-and-a-half inches.

5. The invention of claim 1, wherein the butt plates are spaced at intervals in the range of 30 to 45 inches.

6. The invention of claim 1, wherein the butt plates are spaced at intervals of about 44 inches.

7. The invention of claim 1, wherein each of said butt plates is about 34 inches high.

* * * * *